J. L. DE LANEY.
WASHING AND DRYING MACHINE.
APPLICATION FILED MAY 16, 1921.
1,390,678.
Patented Sept. 13, 1921.
2 SHEETS—SHEET 2.
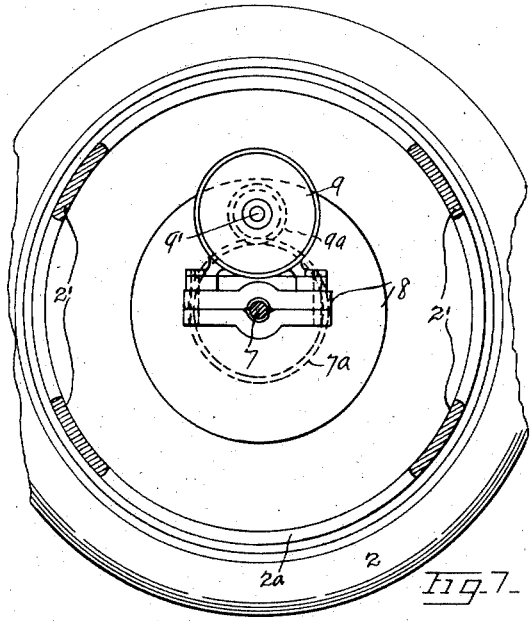
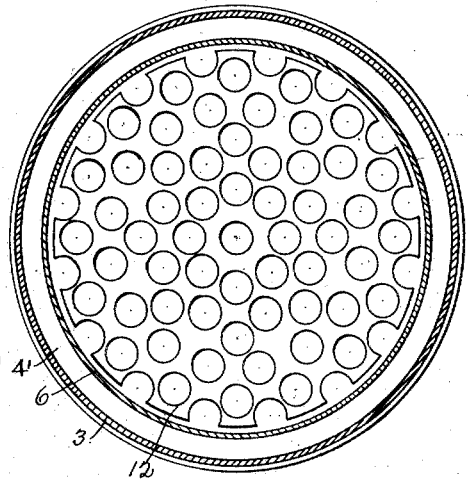
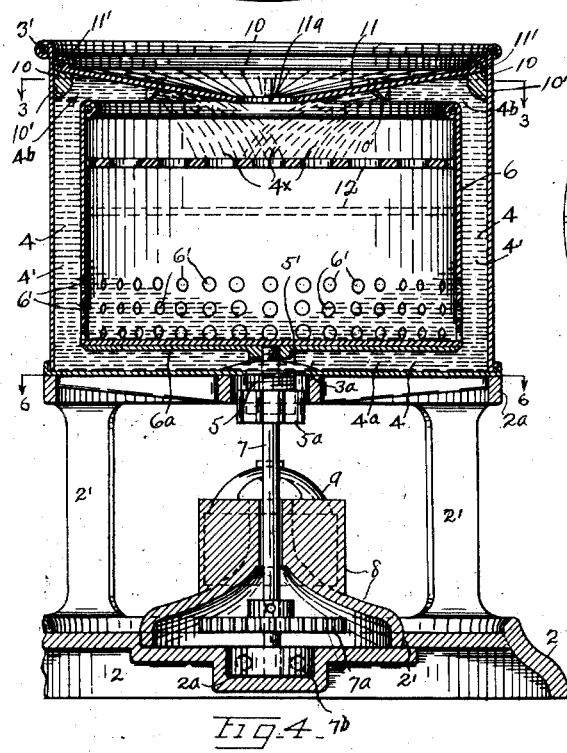
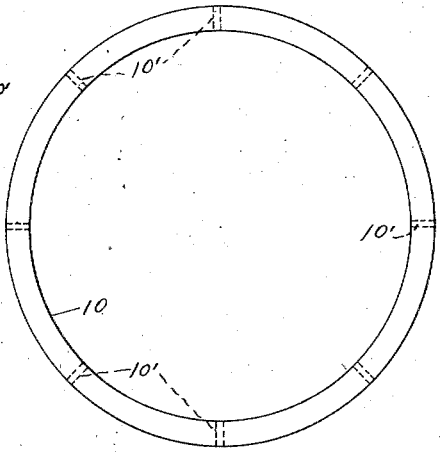
Inventor
Jeremiah L. DeLaney
By Harry D. Wallace
Attorney

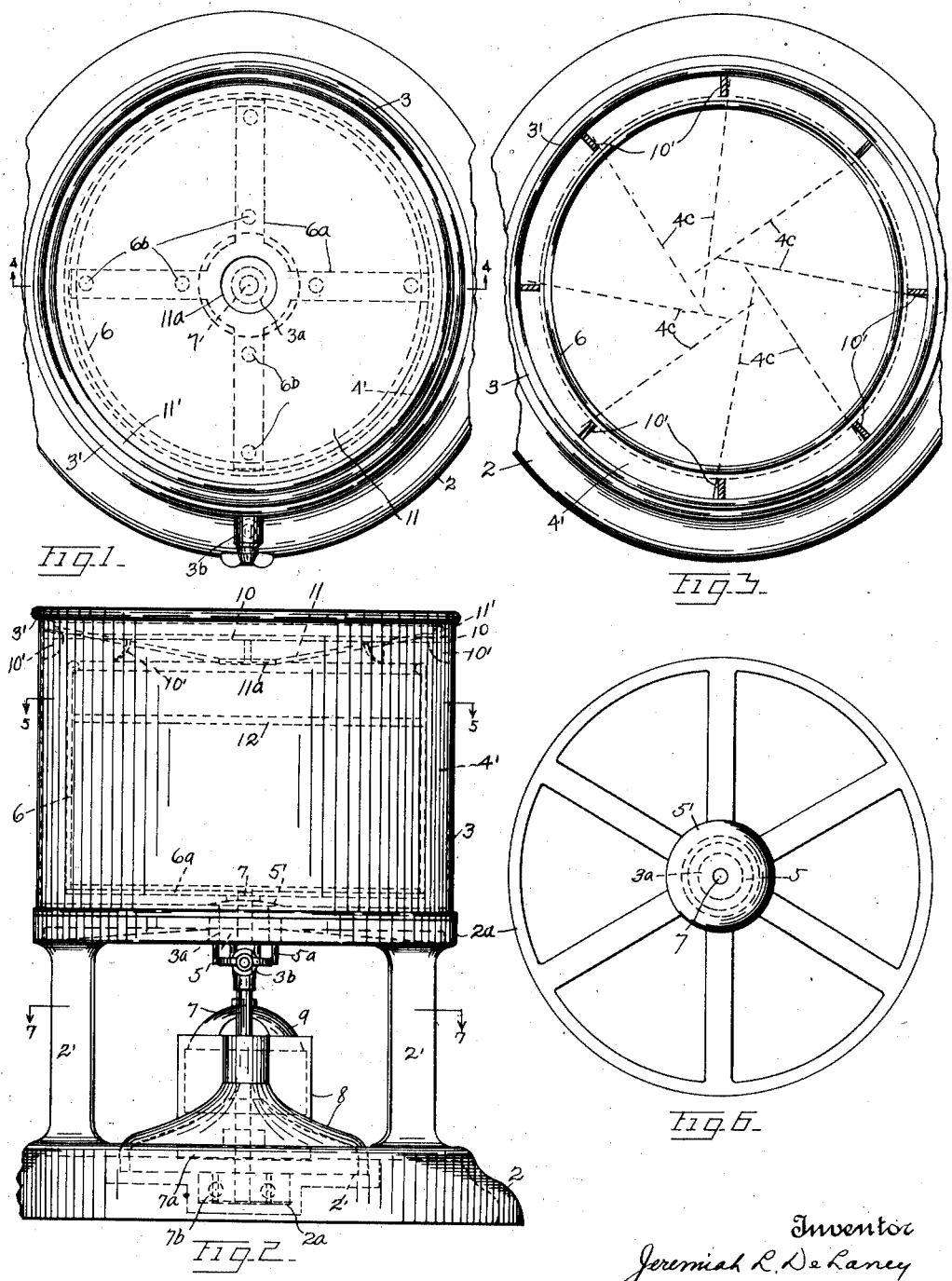

UNITED STATES PATENT OFFICE.

JEREMIAH L. DE LANEY, OF SYRACUSE, NEW YORK, ASSIGNOR TO VORTEX WASHER CORPORATION, OF SYRACUSE, NEW YORK, A CORPORATION OF NEW YORK.

WASHING AND DRYING MACHINE.

1,390,678.       Specification of Letters Patent.       Patented Sept. 13, 1921.

Application filed May 16, 1921. Serial No. 469,877.

*To all whom it may concern:*

Be it known that I, JEREMIAH L. DE LANEY, a citizen of the United States, residing at Syracuse, in the county of Onondaga and State of New York, have invented certain new and useful Improvements in Washing and Drying Machines, of which the following is a specification.

This invention relates to improvements in washing and drying machines, and has as its object to provide a stationary normally open top tub or vat, which is mounted upon a base. A further object is to provide a rotary basket or wash-container, which is cylindrical and has a normally opened top and an imperforate bottom, the basket is preferably of smaller diameter than the tub, and is disposed concentrically within the tub, and is rotated by a power shaft which is driven by suitable mechanism disposed within the base. The vertical walls of the basket are perforated near the bottom for facilitating the outflow or displacement of the washing fluid by centrifugal force when the basket is rotated, and at such times the liquid which is driven from the interior of the basket wells up and races around in the comparatively narrow annular space which occurs between the basket and the tub. When the fluid reaches the top of the basket it is directed inwardly toward the center of the basket, for continuously replenishing the supply of the washing fluid, by a plurality of radially-disposed baffles which extend substantially across the water space between the tub and basket, at or near the top of the basket. These baffles tend to abruptly stop the rising and racing of the liquid due to the centrifugal action of the machine, and direct the divided portions of the fluid inwardly toward the center of the basket. And a further object is to provide a detachable inverted conical cover which is supported by gravity on an annular ledge, the central portion of said cover having a relatively large perforation, which alines axially with the basket. The sloping under surface of the cover coöperates with the baffles for directing the several streams of the liquid toward the center of the basket.

I attain these objects by the means set forth in the detailed description which follows, and as illustrated by the accompanying drawings, in which—

Figure 1 is a top plan view of the complete machine. Fig. 2 is a front side elevation of the same. Fig. 3 is a horizontal section, taken on line 3—3 of Fig. 4; showing the radial baffles and the manner in which they direct the washing-fluid toward the center of the basket. Fig. 4 is a central vertical cross-section, taken on line 4—4 of Fig. 1. Fig. 5 is a horizontal section, taken on line 5—5 of Fig. 2; showing the perforated plate which lies upon the clothes during the washing operation. Fig. 6 is a horizontal section taken on line 6—6 of Fig. 4. Fig. 7 is a similar section taken on line 7—7 of Fig. 2. And Fig. 8 is a plan view of the baffle ring.

In the drawing, 2 represents a hollow circular base from which rises a number of columns 2', the latter being surmounted by a flat open circular top $2^a$.

Upon the base portion $2^a$ is mounted the cylindrical tub or vat 3, which contains the washing-fluid 4. The vat 3 has a normally opened top which is preferably beaded, as at 3'. The bottom of the vat is perforated centrally at $3^a$, to receive the threaded cylindrical portion 5 of the stuffing-box, which depends from the said bottom, the said member being held in place in part by a flangehead 5', which rests upon the top side of the bottom of the vat. $5^a$ represents the second or gland member of the stuffing-box, which screws on to the part 5, and is adjustable in the usual manner. The water or other washing-fluid may be drawn off from the vat 3, by means of a cock $3^b$; the latter being normally closed during the washing operations, but is adapted to be opened for exhausting the air during the drying operations.

The clothes or other articles to be washed are disposed in an upright cylindrical basket 6, preferably sheet metal, which has a normally opened top and an imperforate bottom. The basket 6, is disposed concentrically within the tub 3 and is enough smaller in diameter to provide a clear annular liquid space 4' between the basket and the tub. The lower portion of the vertical walls of the basket 6 is provided with several horizontal rows of perforations 6', through which the water held by the tub 3 may enter the basket, and by means of which the water in the basket is ejected outwardly into the space 4', by centrifugal force when the basket 3 is rotated. The basket 3 is supported and driven by an upright shaft 7, whose upper end portion has its bearing in the stuffing-box 5, and whose extreme top end is threaded and is screwed into the central hub of a spider 6ª, which is rigidly secured to the bottom of the basket 6 by rivets 6ᵇ. By this construction and arrangement, the shaft 7 is the sole support for the basket 6, which does not contact with any of the other parts, and the parts 5 and 6ª are so arranged as to provide a clear horizontal space 4ª, for the liquid between the bottoms of the vat and the basket, as best seen in Fig. 4. The shaft 7 extends downwardly into the base and passes loosely through a conical support or housing 8, whose flaring bottom is received in a circular recess 2′ of the base. Within the housing 8 is disposed a relatively large spur-gear 7ª, which is rigid on the shaft 7. The lower end of shaft 7 is supported by a ball-bearing 7ᵇ, which is disposed in a smaller concentric recess 2ª of the base. The shaft 7 and the basket 6 are rotated by a motor 9, which is supported by the housing 8. The shaft 9′ of the motor carries a pinion 9ª which meshes with and drives the gear 7ª as best seen in Fig. 7.

10 represents an annular ring or ledge, which is disposed concentrically within and near the top of the vat 3, to which it is preferably rigidly secured. The ring 10 is positioned horizontally and preferably approximately midway between the top of the cage 6 and the top of the vat 3, as best seen in Fig. 4, and the breadth of said ring is preferably slightly less than the horizontal depth of the water space 4′, for providing a relatively clear space 4ᵇ for the water to flow from the space 4′ over the top of the basket. From the under side of the ring 10 depend a number of radial vertically disposed baffles 10′, which project into the annular water space 4′ at regular intervals around the tub 3. The lower or free ends of the baffles preferably lie in a plane corresponding to the top edge of the basket 6. 11 represents an inverted conical cover, which is loosely received in the top end of the vat 3, and its circumferential edge rests upon the ledge 10, its sole support as best seen in Fig. 4. The cover is stiffened by a circumferential bead 11′, and its center is provided with a relatively large circular opening 11ª, through which the liquid or air may pass into the vat and basket. The perforated portion 11ª is preferably disposed in about the same plane as the top of the basket. After the soiled clothes are disposed in the basket 6, a perforated plate 12 is usually inserted in the open top of the basket and allowed to rest upon the clothes. The plate 12 serves as a weight for slightly compressing the clothes and preventing them from being tossed about during the rotation of the basket. The plate 12 loosely fits the basket and may therefore gravitate freely, when such action is required, and the said plate exerts a pressure upon the liquid-soaked articles in the basket which increases the centrifugal action to such extent that the liquid rises more steadily and rapidly in the space 4′, than would be the case if the clothes were not weighted. The cover 11 is maintained in the position shown in the drawings by gravity, and therefore preferably fits the vat rather loosely. Any suds or washing fluid which oozes from the vat around the beaded periphery of the cover instead of overflowing the top of the vat, readily flows down the inclined top surface of the cover and is returned to the basket through the perforations 11ª.

The operation of my improved washer and drier is as follows: To start the washing the cock 3ᵇ is first closed, and the vat 3 is partially filled with water and soap or other dirt eradicator. In practice, eight or ten gallons of the fluid is poured into the vat. The soiled clothes or other articles to be washed, are next placed in the basket 6, and the plate 12 is applied, as shown in Fig. 4, in which the full and dotted lines indicate different levels at which the plate 12 may be positioned. The cover 11 is next placed in position on the ring 10. The motor 9 is then started and immediately the basket begins to rotate. At the start of the washing operation the level of the liquid in the vat and basket is preferably slightly above the top-most row of perforations 6′, and as the speed increases to the normal, the level of the fluid within the basket preferably at or near the center steadily falls (see liquid shading in Fig. 4), and the fluid in the meantime is forced outwardly in every direction through the perforations 6′ by the centrifugal force, into the annular space 4′, where it continues to rise until the displaced fluid reaches and contacts with the bottom surface of the ring 10. As soon as the liquid begins to rise in the space 4′ it also starts swirling and racing in the direction in which the basket is revolving, and by the time that the liquid reaches the ring 10 it attains a relatively high speed. When the top surface of the liquid comes into contact with the several depending baffles 10′, the swirling motion of the liquid is abruptly stopped, and the liquid is divided into as many streams or portions as there are baffles, and owing to the force by which the liquid strikes the said baffles the several portions 4ᶜ of the liquid are directed or diverted by the baffles radially toward the center of the basket (see dotted line in Fig. 3). The resistance offered by the baffles tends to throw the liquid horizontally with great force, and before it has a chance to gravitate into the basket, the liquid strikes the sloping bottom surface of the cover 11 and follows the said cover until it reaches the central opening 11ª. From the latter point the liquid, having lost more or less of its momentum, falls into the basket in a continuous shower, as best shown by the dotted lines 4ˣ in Fig. 4. The liquid 4ˣ falls upon and passes through the perforated plate 12, and is reabsorbed by the clothes through which it is drawn and is again driven out through the perforations 6' by the centrifugal force produced by the rotating basket. After the machine has been run for a few moments, the welling-up of the liquid in the annular space 4' as well as the return flow of the liquid, as indicated at 4ˣ, is continuous until the motor is stopped. By the provision and arrangement of the baffles 10' and the coöperation of the cover 11, as described, a steady and copious flow of the liquid is returned to the basket at a point corresponding to the vertical axis of the basket. The returning fluid being delivered to the top central portion of the mass of soiled clothes, and at a point which is farthest from the perforations 6' insures the thorough and rapid cleansing of the clothes. By this construction and arrangement of the machine practically all of the liquid is forced through the fabric in every direction many times during the washing operation, because, in order to reach the perforations 6' the water must be drawn through the fabric, and in doing so, effectually cleanses the mass of clothes. After the clothes are suitably washed, the dirt-removing fluid is drawn off, and is replaced by the usual rinsing water, which is operated upon by the revolving parts, as described. When the washing is finally completed, the cock 3ᵇ is opened, while the machine is still in motion, and all of the liquid is forced and drained from the vat 3. The further rotation of the basket 6 tends to evaporate all of the moisture held by the clothes, and in a short time the clothes are substantially dried. By leaving the cock 3ᵇ open during the drying operation, the basket draws the necessary supply of fresh air through the perforation 11ª of the cover for effecting the drying, and the air is readily exhausted through the cock 3ᵇ. During the drying operation, the plate 12 should be removed.

Having thus described my invention, what I claim as new and desire to secure by Letters Patent, is—

1. In a centrifugal clothes washing and drying machine, the combination of a vat having a normally closed outlet, a cylindrical basket rotatably and concentrically mounted in said vat, the lower portion of said basket provided with horizontal rows of perforations, the top portion of said basket being imperforate, a shaft projecting through the bottom of said vat and supporting and rotating said basket, and an annular ring mounted on the inner encircling walls of the vat, adjacent the top of the basket, the lower surface of said ring being provided with a plurality of depending radial baffles adapted to divert the rising and swirling washing fluid across the top edge and toward the center of the basket.

2. The combination of a vat having a draining valve, a basket concentrically mounted in said vat and its sides and bottom being spaced therefrom, a shaft journaled in the bottom of the vat adapted to support and rotate said basket, the side walls adjacent the bottom of the basket being provided with a number of horizontal rows of perforations through which the washing-fluid is expelled by centrifugal force and caused to rise and swirl in said space until it reaches the top of the basket, an annular ledge disposed near the top of the basket for limiting the rise of the fluid, and a plurality of radial baffles depending from the under side of said ledge adapted to abruptly check the swirling fluid and to divert said fluid radially toward the center of the basket.

3. The combination of a vat having an open top and a normally closed outlet at its bottom, a cylindrical cage of smaller diameter rotatably mounted in the vat and normally spaced therefrom, the lower portion of said cage having a number of perforations, a shaft journaled in the bottom of the vat adapted to support and rotate said cage for expelling the washing fluid and for effecting the rising and racing of the fluid toward the top of the cage, an inverted conical cover loosely covering the open top of the cage, a plurality of radial baffles disposed between the cover and the top of the cage in the path of the rising and racing fluid adapted to abruptly stop the said fluid and to direct the same radially against the under-side of the cover and toward the center of the cage.

4. A clothes washing machine including an upright cylindrical open top vat having a normally closed outlet at its bottom, a shaft journaled concentrically in the bottom of the vat, an upright cylindrical basket supported on the upper end of said shaft and rotated thereby, the lower side walls of the basket being provided with encircling rows of perforations, the walls above said rows being imperforate, said basket having a smaller diameter than said vat for providing an unobstructed circular space between said parts in which the washing fluid is forced and caused to rise and race by the rotation of said basket, until the liquid reaches the top of the basket, a plurality of radial baffles encircling the top of the basket adapted to divide and to divert the liquid horizontally across the top edges of the basket, and an inverted conical cover over-laying said baffles and coöperating with the baffles for returning the liquid to the center of the basket.

5. A centrifugal washing machine including an upright cylindrical vat, a power shaft journaled in the bottom of said vat, a cylindrical basket disposed concentrically within and spaced from said vat, said basket having an open top and being supported and rotated by said shaft, said basket having a number of circumferential rows or perforations adjacent its bottom through which the washing fluid held by the basket is expelled by centrifugal force during the rotation of the basket and caused to rise and race circularly in the space between the basket and the vat, a downwardly and inwardly sloping cover disposed above the top of the basket for limiting the rise of the washing fluid, and a plurality of baffles disposed beneath the circumferential margin of said cover, said baffles extending radially across the said space in the path of the rising and racing fluid adapted to abruptly change the direction of flow of said fluid from the circumference to the center of the basket.

6. A centrifugal washing machine including a cylindrical vat, a cage having a number of circumferential rows of perforations near its bottom rotatably mounted in the vat, a shaft journaled in the bottom of the vat and supporting and rotating said cage for expelling the washing fluid therefrom and causing the same to rise and race between the cage and the vat in a circular path, and a plurality of baffles disposed radially across the path of the rising and racing fluid adapted to change the direction of the flow of the fluid from the circular to a number of radial paths for delivering the said fluid to the center of the cage in a continuous shower.

7. A centrifugal washing machine including a cylindrical vat, a cage having its lower portion perforated rotatably mounted in the vat, a shaft journaled in the bottom of the vat and supporting and rotating said cage for expelling the washing fluid therefrom and for forcing said fluid upwardly between the cage and the vat in a circular path, an annular ring disposed above and in a plane parallel to the top end of the basket for limiting the rise of the washing fluid, a plurality of baffles disposed radially across the circular path of the fluid beneath said ring adapted to effect the divergence of said fluid from the circumference toward the line of the vertical axis of the cage from whence the returning fluid falls in a continuous shower.

8. A centrifugal clothes washing machine including an upright cylindrical vat, an upright cylindrical cage having a number of circumferential perforations near its bottom rotatably mounted in the vat and spaced therefrom, a shaft extending upwardly through the bottom of the vat and supporting and rotating said cage for forcing the washing fluid through said perforations and for causing the same to rise and race in the annular space between the vat and the cage toward the top of the cage, a plurality of baffles disposed radially in a horizontal row substantially in a plane corresponding to the top end of the cage, said baffles adapted to divide the rising fluid into a number of radial streams, and an inverted conical cover mounted above said baffles adapted to coöperate with the baffles for returning the fluid to the center of the cage in a continuous shower from whence the fluid is drawn through the clothes and again expelled by the centrifugal force of the revolving cage.

9. A centrifugal clothes washing machine including a cylindrical vat, a smaller cylindrical cage disposed concentrically in said vat, a shaft for supporting and rotating said cage for expelling the washing fluid from the cage and for causing said fluid to rise and race toward the top of the cage, a plurality of baffles disposed radially around the top end of the cage adapted to divide the said fluid into a number of portions and to cause said portions to converge and fall in a shower at the center of the cage, and means for compressing the clothes for increasing the centrifugal action of the machine.

In testimony whereof I affix my signature.

JEREMIAH L. DE LANEY.